(12) United States Patent
Iwamura

(10) Patent No.: US 8,027,359 B2
(45) Date of Patent: Sep. 27, 2011

(54) EXTENDED SERIAL COMMUNICATION PROTOCOLS

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 957 days.

(21) Appl. No.: 11/690,956

(22) Filed: Mar. 26, 2007

(65) Prior Publication Data

US 2008/0240283 A1    Oct. 2, 2008

(51) Int. Cl.
*H04J 3/16*    (2006.01)
(52) U.S. Cl. .................. 370/465; 370/394; 370/474
(58) Field of Classification Search .......... 370/464–471, 370/394, 474, 500–514
See application file for complete search history.

(56) References Cited

U.S. PATENT DOCUMENTS

| | | | | |
|---|---|---|---|---|
| 5,133,081 A | * | 7/1992 | Mayo | 455/18 |
| 5,802,311 A | * | 9/1998 | Wronski | 709/236 |
| 6,618,397 B1 | * | 9/2003 | Huang | 370/474 |
| 2002/0075873 A1 | * | 6/2002 | Lindhorst-Ko et al. | 370/394 |
| 2002/0075979 A1 | | 6/2002 | Wheatley | |
| 2003/0031172 A1 | * | 2/2003 | Grinfeld | 370/389 |
| 2006/0056403 A1 | * | 3/2006 | Pleasant et al. | 370/389 |

FOREIGN PATENT DOCUMENTS

EP    1189374    3/2002

OTHER PUBLICATIONS

Sony SIRC Protocol; http://www.sbprojects.com/knowledge/ir/sirc.htm; update date Sep. 11, 2006; printed date Jan. 18, 2007.
IR Remote Control Theory; http://www.sbprojects.com/knowledge/ir/ir.htm; update date Sep. 29, 2006; printed date Jan. 11, 2007.

* cited by examiner

*Primary Examiner* — Hassan Kizou
*Assistant Examiner* — Ashil Farahmand
(74) *Attorney, Agent, or Firm* — Fitch, Even, Tabin & Flannery

(57) ABSTRACT

The present embodiments provide methods, systems and apparatuses that facilitate communication between two or more devices. Some of these methods identify a first communication to be transmitted and generate a first plurality of frames such that bit data of each of the frames of the first plurality of frames is different than the bit data of each of the other frames of the first plurality of frames, and that a first frame of the first plurality of frames include at least a first portion of the first communication. The first plurality of frames can then be transmitted.

14 Claims, 11 Drawing Sheets

US 8,027,359 B2

EXTENDED SERIAL COMMUNICATION PROTOCOLS

FIELD OF THE INVENTION

The present invention relates generally to communication, and more particularly to the communication protocols.

BACKGROUND

Serial communication is a common mode of communicating data. Communicating through infrared (IR) light emission and detection is an example of a serial communication method. Infrared (IR) communication units are relatively common and user interfaces, for example, of audio/visual products.

There are multiple IR signal formats. Many of these formats, however, are similar. In some instances, the IR communication forwards commands between two devices. In some IR formats, frames are used to implement the communications. Often these frames include a receiving device product type identification and a command that is to be implemented by the receiving device.

SUMMARY OF THE EMBODIMENT

The present invention advantageously addresses the needs above as well as other needs through the provision of methods, apparatuses, and systems providing serial communication. In some embodiments, methods of implementing communications are provided. Some of these methods identify a first communication to be transmitted; generate a first plurality of frames such that bit data of each of the frames of the first plurality of frames is different than the bit data of each of the other frames of the first plurality of frames, and that a first frame of the first plurality of frames comprises at least a first portion of the first communication; and transmits the first plurality of frames.

Further, some embodiments provide methods of serially communicating data. These methods receive a first plurality of frames each comprises bit data; determine whether the bit data of each of the first plurality of frames is different from the bit data of each of the other frames of the first plurality of frames; extract a portion of the bit data from each of the first plurality of frames when it is determined that the bit data of each of the first plurality of frames is different from the bit data of each of the other frames of the first plurality of frames; arrange the portions of the bit data from each of the first plurality of frames; determine whether the arranged portions of the bit data match a predefined arrangement of sequence numbers; and extract a first payload from first frame of the first plurality of frames when the arranged portions of the bit data match the predefined arrangement of sequence numbers.

Methods of communicating data are also provided in some embodiment that receive a first plurality of frames where each frame comprises bit data; determine whether the bit data of each of the first plurality of frames is different from the bit data of each of the other frames of the first plurality of frames; receive a second plurality of frames where each frame comprises bit data; determine whether the bit data of a first frame of the first plurality of frames is identical to the bit data of a first frame of the second plurality of frames when it is determined that the bit data of each of the first plurality of frames is different from the bit data of each of the other frames of the first plurality of frames; and extract a first payload from the first frame of the first plurality of frames when the bit data of the first frame of the first plurality of data is identical to the bit data of the first frame of the second plurality of frames.

A better understanding of the features and advantages of the present invention will be obtained by reference to the following detailed description of the invention and accompanying drawings which set forth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
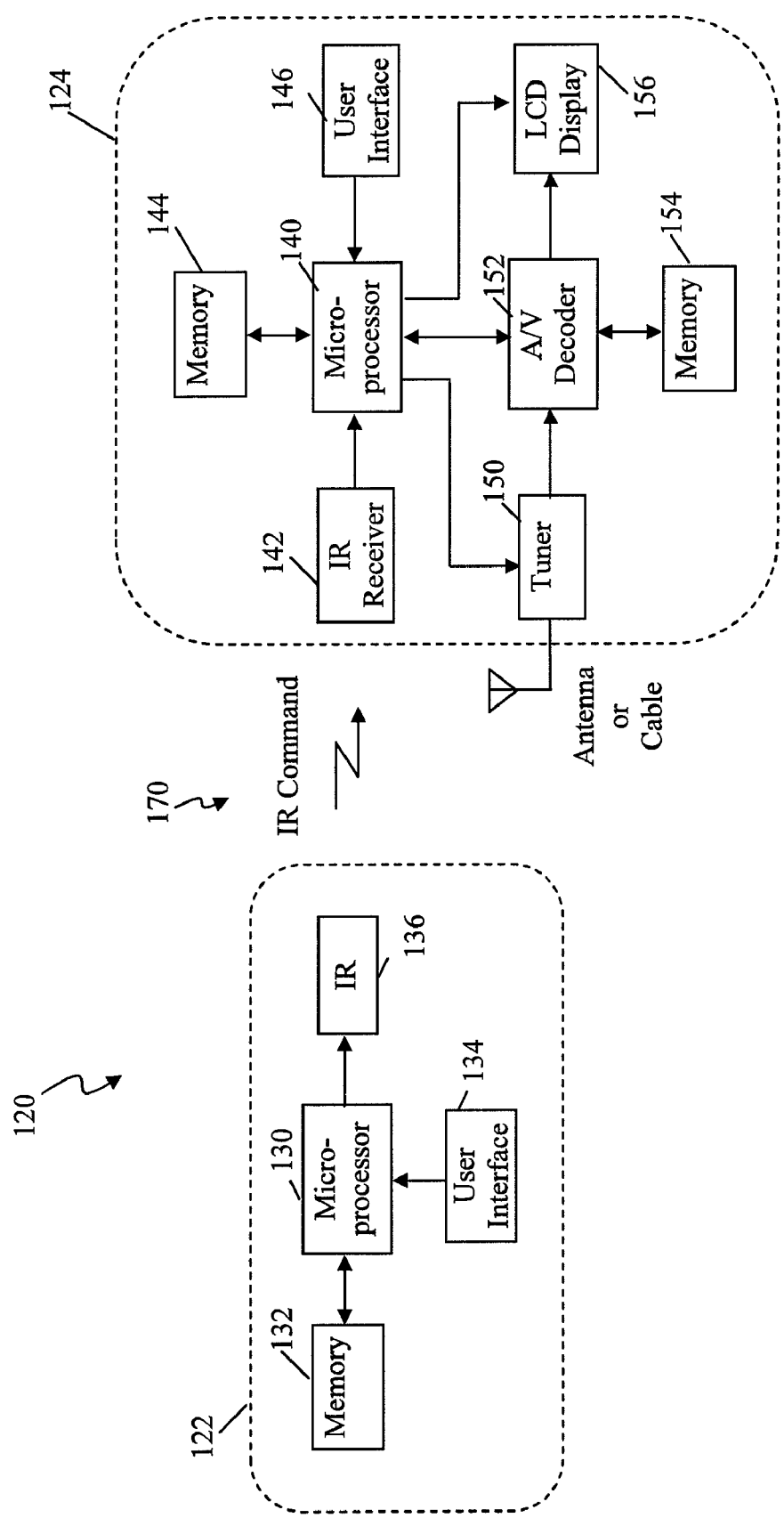
FIG. 1 depicts a simplified block diagram of a communication system according to some embodiments with a transmitting device, such as a remote control unit, communicating with a receiving device.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Serial communication and other similar communications, such as infrared (IR) communication, is a widely used, and often employs relatively inexpensive communication interfaces for many devices, such as remote controls, audio/visual products, consumer electronic device, cameras, computers, printers and other relevant devices. FIG. 1 depicts a simplified block diagram of a communication system 120 with an IR transmitting device, such as a remote control unit 122 communicating using an IR format and/or protocol with an IR receiving device 124. The transmitting device 122 can be substantially any device capable of communicating information and/or commands. Similarly, the IR receiving device can be substantially any device capable of receiving communications and/or commands.

For example, the transmitting device 122 and/or the receiving device 124 can include, but is not limited to, a remote control, a television (TV), set-top-box, digital video disc (DVD) player, digital video recorder (DVR), audio device (e.g., compact disc player, radio, or the like), camera, computer, laptop, calculator, personal digital assistant (PDA), cellular phone, and/or substantially any other relevant device that transmits or receives communications or commands. It will be appreciated by those skilled in the art that the devices of the communication system 120 are representative only, and that many other devices can be utilized without departing from the scope of the invention. Further, the devices 122, 124 are not limited to transmitter and receiver, respectively, but instead one or both devices could include an IR transmitter and receiver. To simplify the description, the transmitting device 122 is referred to below as a remote control, and the receiving device 124 is referred to below as TV, however, the transmitting and receiving devices can be substantially any relevant devices.

The remote control 122 includes a controller 130, a memory 132, user interface 134 and an IR transmitter 136. The controller couples with each of the memory, the user interface and the IR transmitter. Further, the controller 130 can be implemented through a microcontroller, microprocessor, processor or other relevant processing device or combination of devices. The memory 132 can be substantially any relevant memory including, but not limited to, RAM, ROM, EEPROM, flash memory or other relevant memory technology, CD-ROM, digital video disk (DVD) or other optical disk storage and/or substantially any other relevant memory or combinations of memory that can be used to store desired information and that can be accessed by the controller. The memory can store data, information, executables, programs, tables, commands and/or other relevant information.

The IR transmitter 136, for example, can be implemented through a light emitting diode (LED) or other relevant IR transmitter. It will be apparent to those skilled in the art that the transmitter 136 can be replaced with other transmitters without departing from the novelty of the present invention. The user interface 134 can include one or more buttons, touch screen, or other relevant interfaces and/or combinations of interfaces. For example, user interface 134 can include a keypad that includes multiple key buttons that allow users to enter commands, make selections and otherwise use the remote control 122.

The TV 124 includes a controller 140, IR receiver 142, memory 144, user interface 146, a tuner 150, a decoder 152, decoder memory 154, and a display 156. An IR receiver 142 is in communication with the IR transmitter 136 of the remote control 122. The communication channel 170 can be wired or wireless, and in many instances is through wireless infrared communication. The controller 140 can be implemented through a microcontroller, microprocessor, processor or other relevant processing device or combination of devices. The memory 144 and decoder memory 154 can be substantially any relevant memory including, but not limited to, RAM, ROM, EEPROM, flash memory or other relevant memory technology, CD-ROM, digital video disk (DVD) or other optical disk storage and/or substantially any other relevant memory or combinations of memory that can be used to store desired information and that can be accessed by the controller and/or decoder. The memory can store data, information, executables, programs, tables, commands and/or other relevant information. The IR receiver 142 can be implemented through a substantially any relevant receiver such as an optical detector or the like, that can couple with one or more amplifiers, filters, detector, integrator, comparator, IR decoder and the like (not shown). In some implementations the IR decoder is incorporated within the controller 140. The TV user interface 146 can include one or more buttons or other relevant interfaces and/or combinations of interfaces that allow users to power up the TV, enter commands, make selections and otherwise use the TV 124.

In operation, the remote control 122 communicates with the TV 124, for example, through a serial communication protocol, and in many instances is communicated wirelessly, such as through serial IR wireless communication. The signal protocols for IR communications can vary widely, and often depend on the device manufacturers. Typically, however, the varying IR communication protocols are similar. For example, IR communications can be implemented through one or more frames comprising bit data. Frame cycles are commonly between about 30-60 ms, which is often chosen at least in part in attempts to avoid synchronizing with an alternating current (AC) line cycle (e.g., of about 50 or 60 Hz), which may avoid flickering interference and/or other adverse affects. Other cycles, however, can be employed.

In some IR protocols, a signal is modulated to define a series of data bits that form a frame of data bits. This frame series of data bits typically include a receiving product type or device identifier (ID) portion (e.g., portion that identifies a TV, DVD player, CD player, etc.) and a command portion. The command portion can include a command, instruction, request or the like (e.g., stop, play, fast forward, fast rewind, volume up or down, select input source, power, change channel, tune up/down, and substantially any other relevant command, request or instruction), referred to below generally as a command. In some instances, the command portion includes a portion of a single command, or more than one command. In some instances, a frame includes and/or starts with a guard period, followed by payload data (e.g., the device ID portion and the command portion). The frame and/or payload length can vary depending on the IR protocol, the transmitting device, receiving device and/or other factors. Frame lengths can include substantially any relevant number of bits.

The modulation in defining the frames can include, for example, pulse width encoding of the bits, however, other relevant modulation schemes can be used. With pulse width modulation, in some implementations, a burst with a first length defines a one (1) bit and a pulse with a second width can define a zero (0) bit. For example, the pulse representing a logical "1" bit can be about 1.0 ms long burst of a 38 KHz carrier, while a burst width for a logical "0" bit can be about 0.5 ms long. Typically, the bursts are separated by a predefined interval space, for example, about a 0.5 ms long space interval. Further, in some instances, the carrier duty-cycle can be about ¼ or ⅓.

Figure 2:
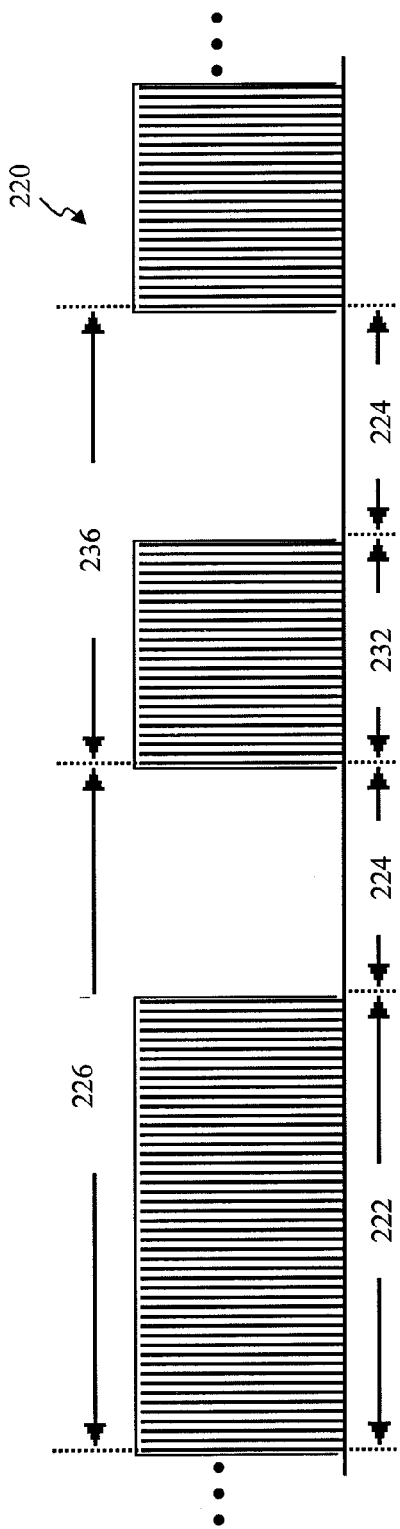
FIG. 2 depicts a simplified graphical representation of an example pulse modulation of a portion of a signal according to some implementations.

FIG. 2 depicts a simplified graphical representation of an example pulse modulation of a portion of a signal 220 according to some implementations. The modulation is implemented such that a first burst 220 has a first length 222 with a separation duration 224 to define a first bit type 226, such as a one (1) bit. A second burst 230 has a second length 232 with the separation duration 224 to define a second bit type 236, such as a zero (0) bit. As an example, the first burst 220 can have a duration 222 of about 1.0 ms and the separation duration 224 can be about 0.5 ms providing a logic one (1) bit 226 with a duration of about 1.5 ms, and the second burst 230 can have a duration 232 of about 0.5 ms with the separation duration 224 of about 0.5 ms providing a logic zero (0) bit 236 with a duration of about 1.0 ms. Some embodiments may employ other pulse modulation schemes and/or other modulation schemes to provide relevant communication.

As introduced above, a frame includes a series of bits that are used to implement the communication between the transmitting device 122 and the receiving device 124. The frame includes multiple bits to define the payload, for example, the device ID and the command. In some instances, the frame can additionally include a guard interval that can be used at least in part to distinguish between frames.

Figure 3:
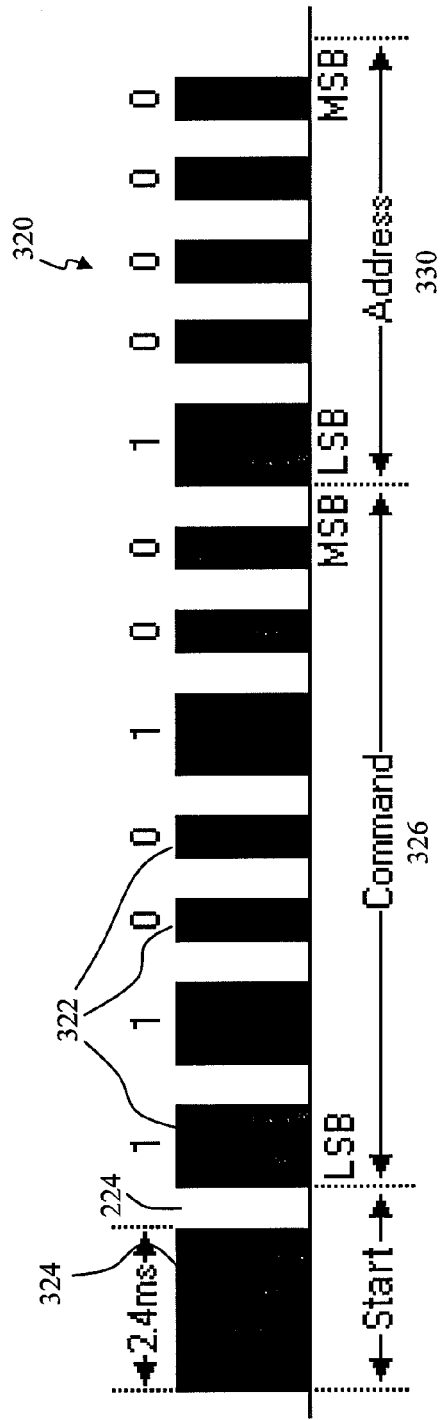
FIG. 3 depicts a simplified graphical representation of an example frame that includes twelve bits of data defined by pulse width modulation.

FIG. 3 depicts a simplified graphical representation of an example frame 320 that includes twelve bits 322 of data defined by pulse width modulation. In this example the frame further includes a guard interval 324 followed by the twelve bits 322. In some instances the guard interval includes a separation duration 224. A first plurality of bits can define the command 326 and a second plurality of bits can define product type or device address 330. For example the command can include seven bits and the product type 330 can include five bits. The ratio of bits between the command and product type can be substantially any relevant ratio, and the number of bits can very depending on the frame structure and/or protocol. The configuration and/or organization of the bit can be substantially any relevant configuration, and in this example the least significant bit is transmitted first.

In many serial communications, such as many IR protocols, a frame may be repeated. For example, a frame may be repeated every 48 ms (measured from start to start) a predefined number of times, repeated for as long as a button on the user interface 134 is held active and/or based on other factors. Further, in some protocols, a series or set of frames are repeated. Typically, the frames can be repeated a predefined number of times each predefined period of time (e.g., repeated three times, with each frame being repeated every 48 ms). It is noted, however, than in many instances the actual length of the communication does not occupy the entire predefined period (e.g., the communication is less than 48 ms). For example, the frame length can be on the order of about 30 ms, followed by 18 ms where no signal is communicated. Further, the frames can include the guard interval (e.g., 2.5 ms) that can in part allow for detection of the beginning of each frame.

A transmitting device 122 may repeatedly transmit the same frame, for example, two or more times in attempts to establish communication with a receiving device 124, to avoid misdetection and/or provide some verification of accuracy of the received communication. When a communication format or protocol provides for the repeating of transmitted frames, the receiving device can evaluate the received frames to determine, at least in part, whether the frame is accurately received. For example, when a frame is repeated and the two frames are identical (or substantially identical depending of the protocol), the receiving device may accept the frame and take appropriate action(s). In determining whether the frames are identical, some embodiments perform a bit compare or other relevant comparison to determine whether bit data of each frame is identical or substantially identical.

Figure 4:
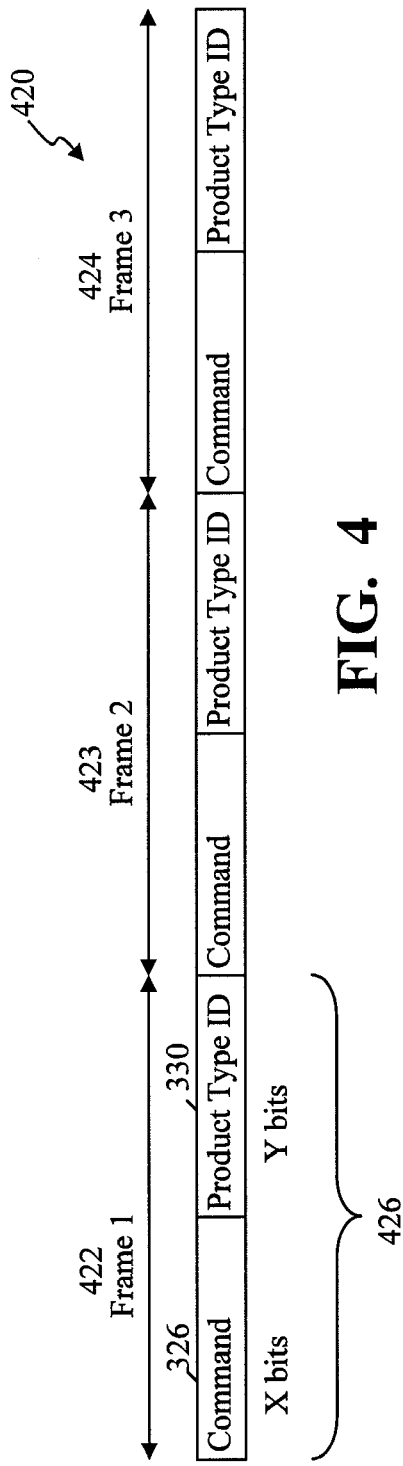
FIG. 4 shows a graphical representation of an example of a series or set of frames according to some implementations.

FIG. 4 shows a graphical representation of an example of a series or set of frames 420 according to some implementations. The set of frames 420 in this instance includes three frames 422-424 transmitted consecutively. The frames each contain a payload 426 that can include, for example, the command portion and the product type ID portion 330, and can be transmitted for example using pulse width modulation similar to that of FIGS. 2 and 3. In some instances, a delay or time gap (not shown) can be included between frames. Further, the frames may additionally or alternatively include a guard interval (not shown in FIG. 4) as described above. When repeating frames the bit data of a first frame typically is identical to bit data of one or both of the second and third frames 423, 424. It is noted, that the two identical or substantially identical frames do not have to be consecutive. For example, duplicate frames can be separated by one or more non-identical frames and/or one or more frames of a first plurality or set of frames can be identical or substantially identical to one or more frames of a second plurality of frames.

The receiving device 124 in determining whether to take appropriate action can evaluate the frames to determine whether two or more frames are identical or are substantially identical. This determination can be based on a bit by bit comparison or other relative determination. When one or more frames are identified as being identical, the receiving device can verify the product type ID 330. When the communication is directed to the receiving device appropriate actions can be taken based on the command 326.

Many devices use IR communications. A limited number of codes to define a device type 330 and/or commands 326 are available due to the limited number of bits available for frames (and/or the frame rate or cycle). In some instances, protocols typically cannot be extended or are relatively difficult to extent. Additionally, in some applications, for example, network device registration employ IR communication to transmit key data. Often the frame cycle is too short to extend the data length. Further, extending the protocol may prevent legacy and/or existing devices from communicating with newer devices or newer devices may have to include additional complexity in order to provide communication using existing protocols as well as extended protocols.

Some present embodiments, however, provide relatively simplified methods of extending one or more existing protocols while providing backwards compatibility and that do not adversely interfere with the operation of legacy products. Further, some embodiments provide relatively low-cost and simplified methods to extend the existing protocols (such as IR protocols) while maintaining backward compatibility. Some embodiments, in part, take advantage of the fact that many legacy devices only evaluate communications when two or more identical frames are received to extend existing protocols. These embodiments can force a plurality of frames to be different such that legacy devices will not consider that frames, while enhanced and/or new devices can evaluate the communication to determine whether further processing should be continued.

Figure 5:
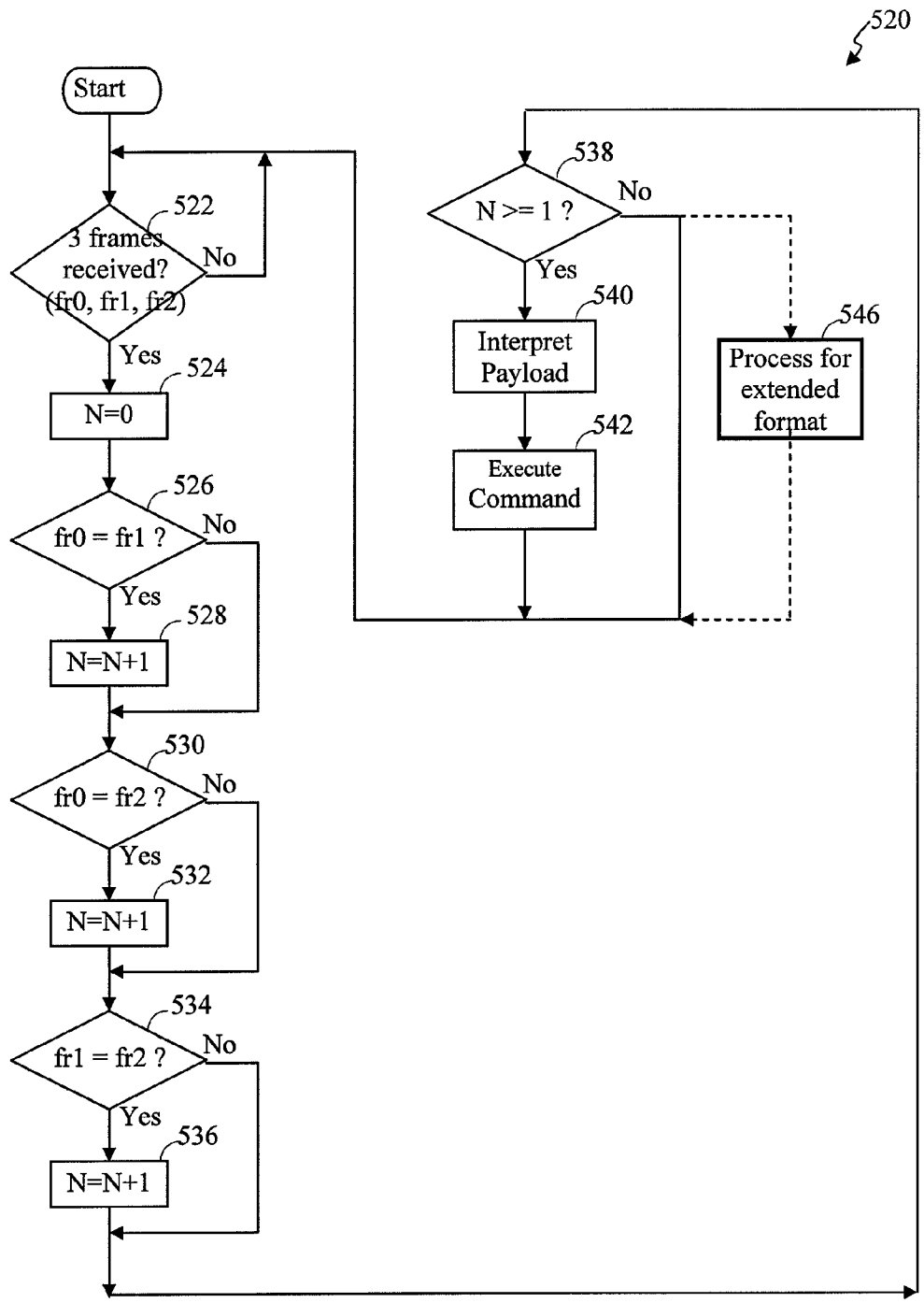
FIG. 5 depicts a simplified flow diagram of a process, according to some embodiments, that evaluates communications.

FIG. 5 depicts a simplified flow diagram of a process 520, according to some embodiments, that evaluates communications. In step 522 it is determined whether a predetermined number of frames have been received. For examples, it can be determined whether three frames have been received or other relevant number of frames. When a predetermined number of frames have not been received the process continues to loop waiting until the predetermined number of frames is received. In step 524, a compare count variable is set to zero. In step 526, a first frame is compared with the second frame to determine whether the first frame is identical to or substantially identical to the second frame. In some embodiments, the comparison of frames includes a bit by bit compare of the bit data of the frames. Other relevant comparisons can additionally or alternatively be employed.

When the first and second frames are substantially identical the process 520 continues to step 528 where the compare count variable is incremented. Alternatively, the process continues to step 530 where the first frame is compared with a third frame to determine whether the first frame is identical or substantially identical to the third frame. When it is determined that the first frame is identical to the third frame step 532 is entered where the compare count variable is incremented. In step 534 it is determined whether the second frame is identical to or substantially identical to the third frame. When the second and third frames are identical the compare count variable is incremented in step 536. The example process 520 is shown comparing three frames. Other numbers of frames can be compared, and is not limited to three. As such, a comparison of two or more frames can be preformed. Following steps 534 and 536, the process continues to step 538 where it is determined whether the compare count variable is greater than or equal to one. This allows a determination of whether two or more of the predefined numbers of frames are identical.

As indicated above, some embodiments process the communications when it is confirmed that two or more frames are identical. Many legacy devices operate in this manner and await identical frames prior to processing the communication. Step 538, in part, allows present embodiments to be backwards compatible with legacy devices. When it is determined in step 538 that two or more frames are identical or substantially identical the process continues to step 540 where the payload of the identified identical frames is interpreted. This can include extracting the device type ID and confirming the device type ID, and extracting the command. In step 542, the command is executed or other appropriate action can be taken. Further, step 538 in part allows these embodiments to extend communication protocols as described above and further below. When it is determined in step 538 that two or more frames are not identical or substantially identical the process continues to step 546 where the frames may be further processed.

Communication protocols and/or formats can be extended in some embodiments by forcing frames to be different. Typically, legacy devices evaluate a predetermined number of consecutive frames, such as three or more frames, in determining whether to process the communication (e.g., see step 522). When two or more frames are not identical typically legacy devices ignore the communications. By forcing consecutive frames to be different some embodiments can extend communication protocols and/or formats.

Some embodiments employ a coincident check mechanism to extend a communication protocol. This check mechanism can include assigning a sequence number to each frame so that any of a predefined number of frames (e.g., three consecutive frames) are not identical. The sequence number is, for example, a 2-bit long sequence. When a frame comprises 20 bits, for example, the payload length is 18 bits and the 2-bit sequence is incorporated.

Figure 6:
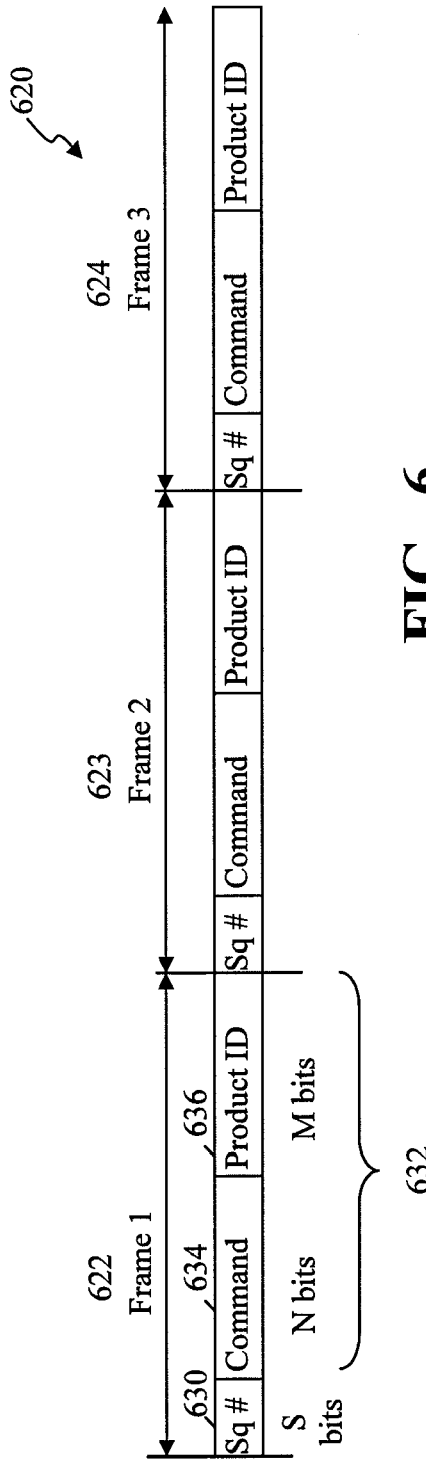
FIG. 6 shows a graphical representation of an example of a set or series of frames according to some implementations.

FIG. 6 shows a graphical representation of an example of a set or series of frames 620 according to some implementations. The set of frames in this instance includes three frames 622-624 transmitted consecutively. The number of frames in the set can include substantially any relevant number. The frames each contain a sequence number 630 and a payload 632 that can include a command portion 634 and a product type ID portion 636, and can be transmitted for example using pulse width modulation similar to that of FIGS. 2 and 3, or other modulation. In some instances, a delay or time gap can be included between frames, and/or a guard interval or the like can be included. The sequence numbers 630 are selected such that the bit data is different for the three (or other predefined number) of frames 622-624. Because the sequence numbers are different, some present embodiments establish that the three frames 622-624 will be detected by a receiving device as not being identical, and legacy devices typically will not process these three frames if they are received. The sequence number can be positioned within the frame in substantially any position and does not need to be, for example, at the top of the frame. As an example, the frame 622 may include twenty (20) bits, with two (2) bits defined for the sequence number, with nine (9) bits for each of the command portion 634 and a product type 636.

Further, some present embodiments when employing the process 520 of FIG. 5 also identify in step 538 that the frames are not identical and continue to step 546 to further evaluate the frames. Again, the frames being compared do not have to be consecutive frames. The sequence numbers 630 can be extracted from the frames and used to determine whether further processing is to take place.

The pattern, arrangement or order of the sequence numbers 630 can be substantially any relevant pattern and/or can comprise substantially any number of bits. For example, the pattern of sequence numbers can be: 0, 1, 2, 0, 1, 2, . . . (e.g., in two bit binary: 00, 01, 10, 00, 01, 10, . . . ). The payloads 632 of the plurality of frames can be used relatively freely, for example, the same payload may be repeated three times in three different frames (each with the differing sequence number), each of the plurality of frames may carry a different payload, or other such implementations. Legacy receiving devices 124 do not detect two identical frames in a predefined plurality of frames (e.g., set of three frames) and the frames will be discarded by devices that do not check for the sequence numbers. As such, the incorporation of the sequence numbers 630 does not adversely affect or interfere with the operation of legacy receiving devices that look for identical frames to trigger activation and/or implementation. Further, the sequence numbers allow the protocols and/or codes to be extended so that some present embodiments detect the sequence numbers and recognize that the frames potentially contain commands relevant to the receiving device.

Further, as introduced above, the payloads can be relatively freely used. In some instances, the payloads can include identical payloads. In other embodiments, one command can extend over multiple frames. In some implementations, one or more of the bits of the payload can be used to identify to the receiving device whether the payload extends beyond a single frame (e.g., a certain bit set at a zero (0) defines a single frame command, while that same bit set at a one (1) defines two frames or more). Additionally or alternatively, a frame can include an identifier as a first frame of a command while a later frame can identify a last frame of a command. Other configurations can be employed. The sequence numbers 630 further allow the frames to be distinguished while attempting to ensure that the frames are not identical.

Figure 7:
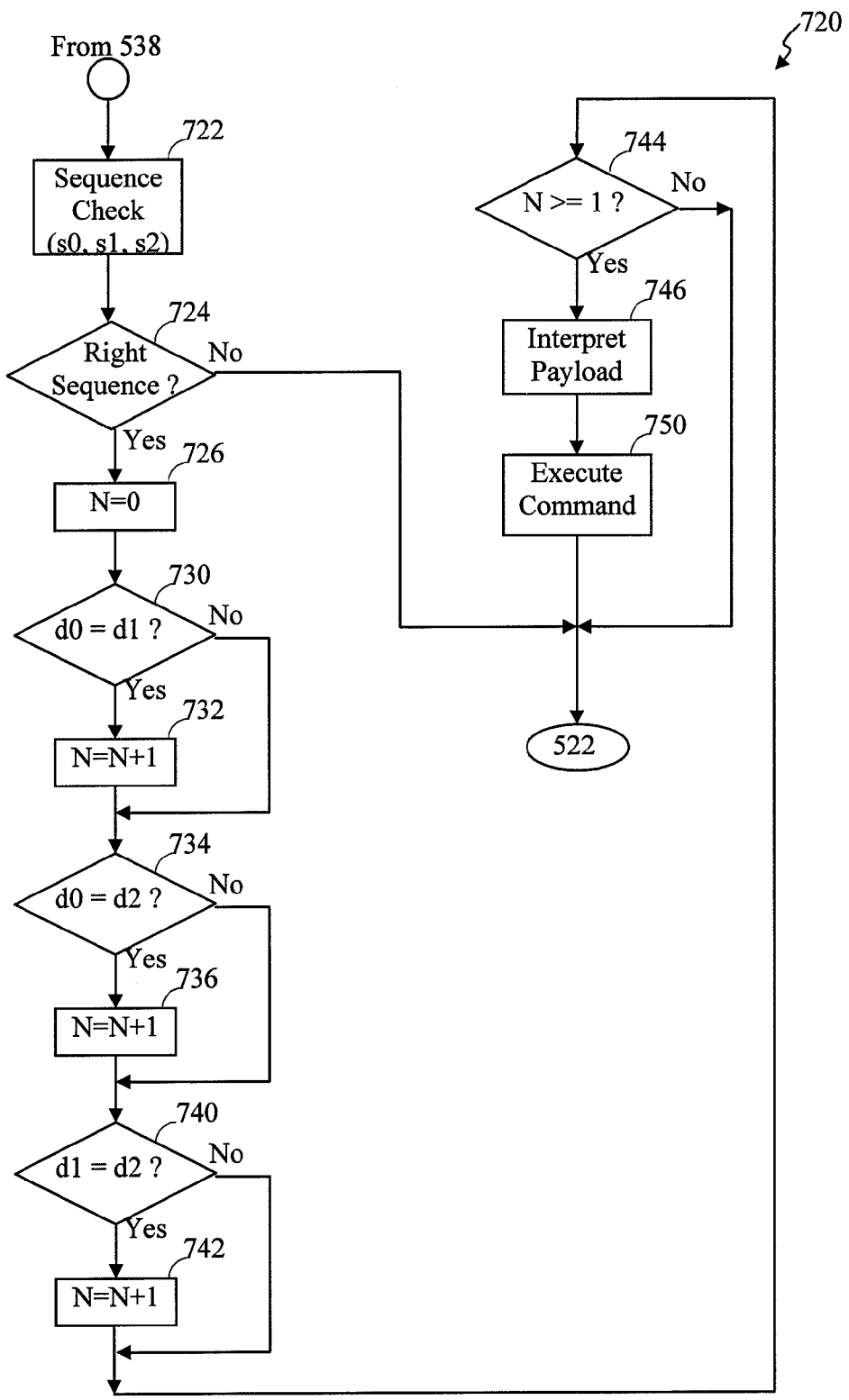
FIG. 7 depicts a simplified flow diagram of a process used by some embodiments to identify frames that should be further processed based on an extended protocol.

FIG. 7 depicts a simplified flow diagram of a process 720 used by some embodiments to identify frames that should be further processed based on an extended protocol. In some implementations this process is activated following steps 538 and/or represents an implementation of step 546. In step 722, sequence numbers are extracted from each of the predefined number of frames (e.g., frames identified in step 522) and organized. In some implementations, sequence numbers are organized according to the order in which they were received, for example, consecutively. Other arrangements, however, can be utilized.

In step 724, the sequence numbers are compared to one or more predefined patterns of sequence numbers to determine whether the arranged sequence numbers correlate and/or match one or more predefined patterns of sequence numbers. When the arranged sequence numbers do not match a predefined pattern, the process 720 terminates and/or returns to step 522 in attempts to identify frames. Alternatively in step 726 the compare count variable is set to zero.

In step 730, the payload 632 of a first frame (e.g., the remainder bits) excluding the bits defining the sequence number of a first frame are compared with the payload of a second frame (e.g., remainder bits) excluding the bits defining the sequence number of the second frame to determine whether the payload of the first frame is identical to or substantially identical to the payload of the second frame. When the payloads of the first and second frames are identical the process 720 continues to step 732 where the compare count variable is incremented. Alternatively, the process continues to step 734 where the payload 632 of the first frame is compared with the payload of a third frame to determine whether the payloads of the first and third frames are identical or substantially identical. When it is determined that the first frame is identical to the third frame step 736 is entered where the compare count variable is incremented.

In step 740, it is determined whether the payload 632 of the second frame is identical to or substantially identical to the payload of the third frame. When the payloads of the second and third frames are identical the compare count variable is incremented in step 742. Following steps 740 and 742, the process continues to step 744 to determine whether the compare count variable is greater than or equal to one. This allows a determination of whether two or more payloads of the predefined number of frames are identical. When it is determined in step 744 that payloads of received frames do not match, the process can return to the process 520 of FIG. 5.

Alternatively, in step 746 the payload of one or more of the frames can be interpreted. This can include extracting the device type ID 636, confirming the device type ID (e.g., comparing the device ID with a predefined and/or locally stored device ID), and extracting the command 634. In step 750, the command can be executed or other appropriate action can be taken.

Again, some embodiments can expand protocols by ensuring that frames are different so that legacy receiving devices ignore the frames while allowing some present embodiments to detect that the frames are to be further evaluated. Utilizing coincident check mechanisms, such as employing sequence numbers and predefined patterns of sequences numbers, systems can utilize the payloads in one or more frames.

As such, some embodiments check for sequence numbers and/or determine whether the order of sequence numbers of a predefined number of frames (e.g., four incoming consecutive frames) match a predefined and/or expected order or pattern. When the pattern of the sequence numbers is verified the payload is further evaluated. In some instances, when at least two of the plurality of frames have the same payload data, the receiving device 124 accepts one of the identified frames as a valid frame. For example, four sequence numbers can be extracted from each of four frames and stored (e.g., stored according to variables s0, s1, s2 and s3) (e.g., see step 722). When the order of the sequence numbers matches a predefined order, for example incremental, the payloads are evaluated to determine whether the three payloads are identical. When two or more payloads are identical the payload(s) is interpreted and the command is executed (or other appropriate action can be initiated).

The arrangement or pattern of sequence numbers does not need to be incremental or decremental. When sequence numbers are utilized in frames that are transmitted in a group for example of three consecutive frames there are, for example, eight sequence variations available in which to arrange or order the sequence numbers in the respective frames. Table 1 below shows an example of eight patterns or orders for sequence numbers of frames.

TABLE 1

Arrangements of Sequence Numbers

| Arrangement | Sequence Numbers |
|---|---|
| a1 | 0, 1, 2, 0, 1, 2, 0, 1, 2, . . . |
| a2 | 0, 2, 1, 0, 2, 1, 0, 2, 1, . . . |
| a3 | 1, 2, 3, 1, 2, 3, 1, 2, 3, . . . |
| a4 | 1, 3, 2, 1, 3, 2, 1, 3, 2, . . . |
| a5 | 2, 3, 0, 2, 3, 0, 2, 3, 0, . . . |
| a6 | 2, 0, 3, 2, 0, 3, 2, 0, 3, . . . |
| a7 | 3, 0, 1, 3, 0, 1, 3, 0, 1, . . . |
| a8 | 3, 1, 0, 3, 1, 0, 3, 1, 0, . . . |

It is noted that in some instances a pattern of "1, 0, 2, 1, 0, 2, . . . " is identified as being identical to the arrangement (a2) of Table 1. As such, the number of possible arrangements may be limited. For example, in some instances the receiving device may not identify the first sequence number, such as in instances where a first frame is accidentally dropped. However, in other implementations, the receiving device 124 may distinguish between the pattern of "1, 0, 2, 1, 0, 2, . . . " and the arrangement (a2) of Table 1 (e.g., by identifying a first frame of a group of frames). Utilizing the eight different sequence number arrangements or patterns, communication protocols and/or payload combinations can be extended eight times.

When the sequence numbers are defined by two-bit binary numbers, there are four available sequence numbers (i.e., 00, 01, 10 and 11). As such, in some additional or alternative implementations all of the four numbers of the 2-bit sequence numbers can be used further extending the protocols to include six or more additional potential arrangements and/or patterns. Table 2 shows the six additional potential arrangements.

TABLE 2

Additional Arrangements of Sequence Numbers

| Arrangement | Sequence Numbers |
|---|---|
| a9 | 0, 1, 2, 3, 0, 1, 2, 3, . . . |
| a10 | 0, 1, 3, 2, 0, 1, 3, 2, . . . |
| a11 | 0, 2, 1, 3, 0, 2, 1, 3, . . . |
| a12 | 0, 2, 3, 1, 0, 2, 3, 1, . . . |
| a13 | 0, 3, 1, 2, 0, 3, 1, 2, . . . |
| a14 | 0, 3, 2, 1, 0, 3, 2, 1, . . . |

In utilizing the four numbers, the transmitting device 122 can, for example, transmits a set or grouping of four frames. As described above, the receiving device 124 checks the four frames, extracts the sequence numbers, organizes the sequence numbers and verifies whether one or more of the payloads of the frames are identical. In some instances, the fourth payload may be a copy of a previous frame, dummy data, different payload data or the like.

The communication protocols and/or payload combinations can be still further extended, for example, by increasing the number of sequence numbers available to be utilized. For example defining the sequence numbers by three bits or more, greater numbers and/or variations of patterns or arrangements are available. Some embodiments, however, attempt to provide some error robustness and/or prevention. For example, in some implementations, the numbers of available sequence number arrangements are limited.

Figure 8:
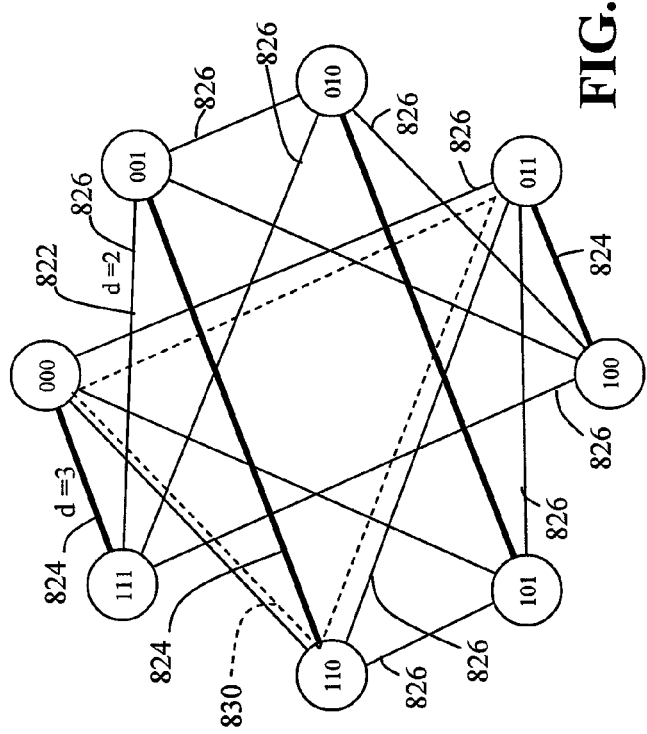
FIG. 8 depicts a simplified graphical representation of a plurality of 3-bit numbers and their defined Hamming distance.

Some embodiments employ code redundancy with sequence numbers defined by 3-bits or more in efforts to, at least in part, improve error robustness. The Hamming distance between two sequence numbers is the number of positions for which the corresponding symbols (i.e., bits) are different. FIG. 8 depicts a simplified graphical representation of a plurality of 3-bit numbers and their defined Hamming distance. For example, the Hamming distance 822 between "111b" and "001b" is 2 (where the character "b" indicates a binary expression). When sequence numbers have a Hamming distance of 1, transmission and/or reception errors can occur when a bit accidentally is detected as another number. For example, the binary number "010b" could be received as a binary number of "011b" or a binary number of "110b" based on a single bit change. As a result, some embodiments restrict sequence number arrangements or patterns so that two consecutive sequence numbers have a Hamming distance of 2 or more.

Still referring to FIG. 8, Hamming distances are shown for the 3-bit binary numbers. The Hamming distances of 3 are labeled in FIG. 8 by reference numeral 824, and Hamming distances of 2 are labeled by reference numeral 826. Sequence number arrangements can be limited, in some embodiments, to binary numbers that can be linked by a triangle of Hanning distances of 2 or more, for example, the triangle 830. When limiting the sequence number arrangements or patterns there are eight possible combinations, with each combination having two directions (e.g., based on the identified triangles in FIG. 8: clockwise and counter-clockwise). As such, a total of sixteen combinations are available as identified in Table 3.

TABLE 3

Arrangements having Hamming numbers of 2 or greater

| Arrangement | Sequence Order | Bit Sequence Order |
|---|---|---|
| C1 | 0, 3, 5, 0, 3, 5, . . . | (000b, 011b, 101b, 000b, 011b, 101b, . . . ) |
| C2 | 0, 5, 3, 0, 5, 3, . . . | (000b, 101b, 011b . . . ) |
| C3 | 0, 3, 6, 0, 3, 6, . . . | (000b, 011b, 110b . . . ) |
| C4 | 0, 6, 3, 0, 6, 3, . . . | (000b, 110b, 011b . . . ) |
| C5 | 0, 5, 6, 0, 5, 6, . . . | (000b, 101b, 110b . . . ) |
| C6 | 0, 6, 5, 0, 6, 5, . . . | (000b, 110b, 101b, . . . ) |
| C7 | 1, 4, 7, 1, 4, 7, . . . | (001b, 100b, 111b . . . ) |
| C8 | 1, 7, 4, 1, 7, 4, . . . | (001b, 111b, 100b . . . ) |
| C9 | 1, 2, 7, 1, 2, 7, . . . | (001b, 010b, 111b . . . ) |
| C10 | 1, 7, 2, 1, 7, 2, . . . | (001b, 111b, 010b . . . ) |
| C11 | 1, 2, 4, 1, 2, 4, . . . | (001b, 010b, 100b . . . ) |
| C12 | 1, 4, 2, 1, 4, 2, . . . | (001b, 100b, 010b . . . ) |
| C13 | 2, 4, 7, 2, 4, 7, . . . | (010b, 100b, 111b . . . ) |
| C14 | 2, 7, 4, 2, 7, 4, . . . | (010b, 111b, 100b . . . ) |
| C15 | 3, 5, 6, 3, 5, 6, . . . | (011b, 101b, 110b . . . ) |
| C16 | 3, 6, 5, 3, 6, 5, . . . | (011b, 110b, 101b . . . ) |

Therefore, some embodiments extend communication protocols at least in part by incorporating sequence numbers into the frames of the communication, and can further provide some error protection by limiting the arrangements of sequence numbers. These sequence numbers are selected so that the bit data of the frames are different. Legacy devices effectively ignore these frames. Some present embodiments, however, extract the sequence numbers and when identified as matching an expected or known sequence arrangement or pattern, the frames can be further processed extending the communication protocols.

Some embodiments additionally or alternatively extend the communication protocols without incorporating sequence numbers into the frames. In some instances, a set of frames are transmitted so that no two frames in the set are identical. For example, when the set of frames comprises three frames, any two in three frames are not identical. As introduced above, many communication protocols transmit frames in a consecutive set and often two of the frames are identical. This allows detecting devices to verify the communication. For example, three consecutive frames can be transmitted as a set of frames as expected by a receiving device according to some protocols, and at least two of those three consecutive frames are identical. Upon receipt of the frames, the receiving device detects the two identical frames and processes the frame. In many legacy receiving devices, however, when all of the three frames are different and none are identical, they ignore the communication and/or discard the communication.

Some present embodiments configure a set of frames (e.g., a set of three consecutively transmitted frames) such that each of the three frames is different. Upon detecting that the frames are different these embodiments further evaluate the frames to determine whether additional processing is to be performed relative to these frames. Legacy devices, however, typically discard the frames. This allows for the communication protocol to be extended.

Figure 9:
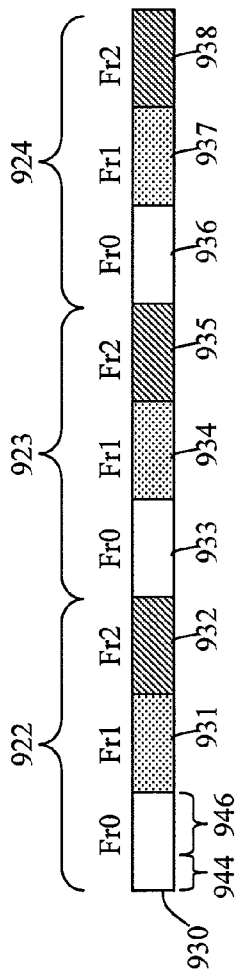
FIG. 9 depicts a simplified block diagram representation of an example of a set of frames, where each set consisting of a plurality of frames.

FIG. 9 depicts a simplified block diagram representation of an example of three sets 922-924 of frames 930-938, each set consisting of three frames. These frames do not include sequence numbers, however, each frame within a set is different. In at least some of these embodiments, all of bits (e.g., 20 bits) may be used for the payload. For example, a first frame 930 of a first set 922 can contain a first bit data (e.g., Fr0 data) that includes a desired command 946 (or other relevant information) and a valid product type ID 944 of an intended receiving device. The second and third frames 931, 932 of the first set 922 contain second and third bit data, respectively (e.g., Fr1 and Fr2 data) that are different than the first bit data (i.e., Fr0≠Fr1, Fr0≠Fr2 and Fr1≠Fr2). In some instances, the second and third bit data (Fr1 and Fr2) are dummy frames with dummy data and/or invalid commands and/or product type IDs. In other embodiments, however, the bit data Fr1 and Fr2 can simply be different than the first bit data Fr1. The second sequence 923 of frames similarly includes a first frame 933 that is a duplicate or is identical to the first frame 930 (i.e., comprising the same bit data Fr0) of the first set 922, and the second and third frames 934, 935, respectively, of the second set are dummy data and/or are different than the first data (in some instances may be identical to the second and third frames 931, 932 of the first set 922).

A receiving device discards or temporarily ignores the second and third frames 931, 932, and upon receipt of the second set of frames 923 compares the first frame 930 with one or more of the frames 933-935 of the second set 923. When one of the frames of the second set 923 is identical to the first frame 930 of the first set 922, the receiving device confirms accurate reception of the first frame 930 and further processes the first frame by extracting the product type ID 944 and command 946 payloads when appropriate.

In some implementations, the receiving device waits until a predefined number of sets are received (e.g., the three sets of frames 922-924) before ignoring or discarding the first frame 930. Similar to the second set, the first frame 930 can be compared with one or more of the frames 936-938 of a third set of frames 924. Again, when the first frame 930 is identical to one or more of the frames of the third set, the first frame is confirmed as intended to be processed and continues to process the frame.

Figure 10:
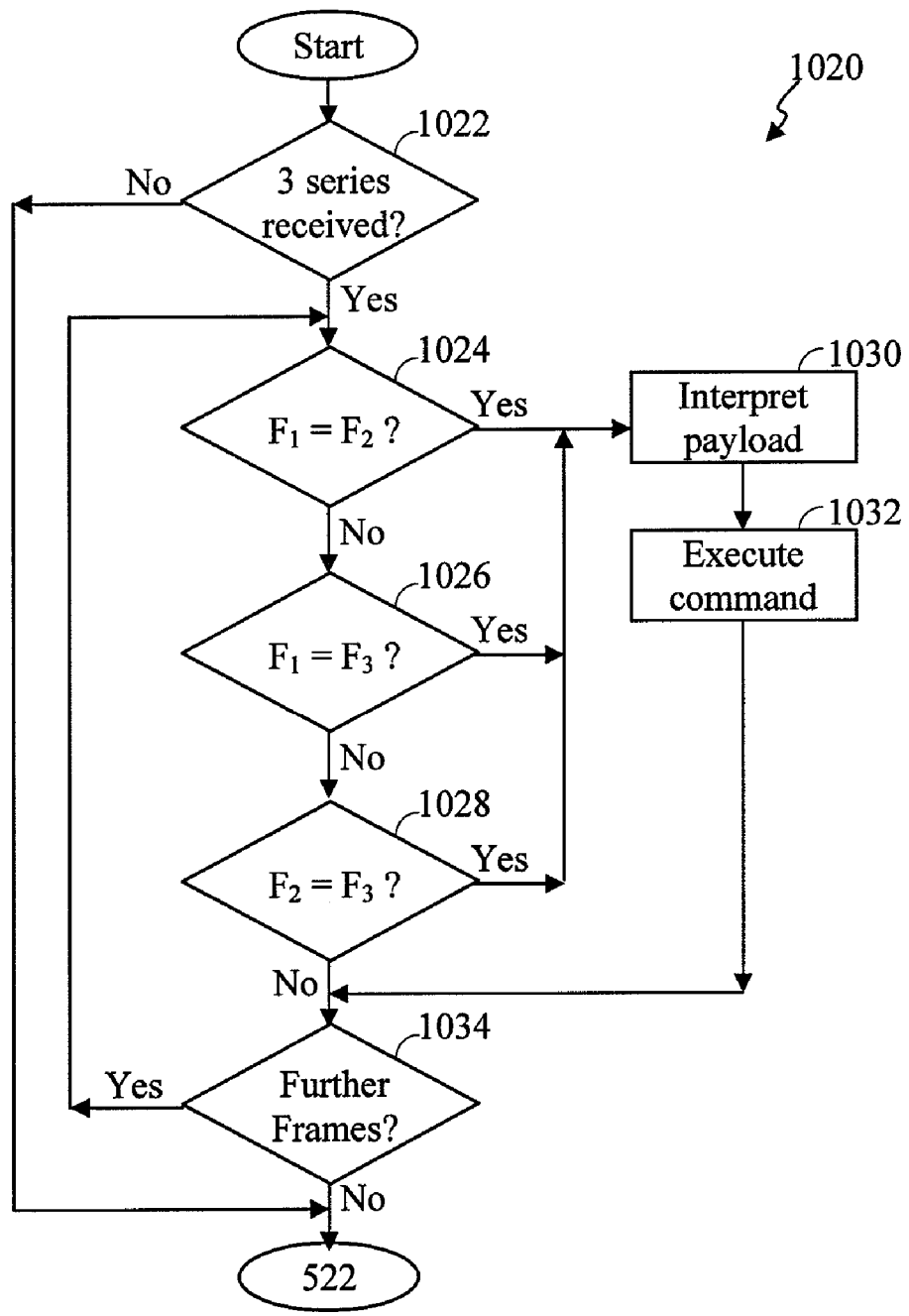
FIG. 10 shows a simplified flow diagram of a process according to some embodiments to evaluate frames.

FIG. 10 shows a simplified flow diagram of a process 1020 according to some embodiments to evaluate frames. In some implementations, the processed 1020 can be implemented in place of step 546 of FIG. 5. At step 1022 it is determined whether a predefined number of sets of frames are received. The predefined number can be substantially any number, and in the example of FIG. 9 can be three sets 922-924 with each set comprising three frames 930-932, 933-935 and 936-938. In those instances where the predefined number of sets of frames is not received the process loops awaiting the predefined number or returns to step 522 of FIG. 5.

When the predefined number of sets of frames has been received the process continues to step 1024 where a frame (e.g., frame 930) in a first set of frames (e.g., set 922) is compared with the frames (e.g., 933) of a second set of frames (e.g., set 923) to determine whether the first frame in the first set is identical to and/or substantially identical to one or more of the frames of the second set. When the first frame is not identical to a frame of the second set the process may continue to optional step 1026 where the first frame 930 of the first set 922 is compared to the frames (e.g., 936) of a third set of frames (e.g., 924) to determine whether the first frame in the first set is identical to and/or substantially identical to one or more of the frames of the third set.

When the first frame is not identical to a frame of the third set the process may continue to optional step 1028 where one or more frames 933 of the second set 923 can be compared to the frames (e.g., 936) of the third set of frames (e.g., 924) to determine whether a frame in the second set is identical to and/or substantially identical to one or more of the frames of the third set. Steps 1026 and 1028 are optional in that the receiving device may only be expecting to compare the frames of the first set with one other set of frames. In some embodiments, additional steps similar to steps 1024, 1026 and 1028 can be included when the receiving device expects to compare more than three sets of frames.

When it is determined in step 1024, step 1026 or step 1028 that a frame is identical to one or more of the frames in the second or third sets of frames the process continues to step 1030 where the payload of the frame 930 is interpreted. Step 1030 in some embodiments is similar to step 746 in FIG. 7 where the product type ID 944 is extracted and evaluated and the command 946 is extracted when the product ID is confirmed. In step 1032, the command 946 is executed and/or other appropriate actions are taken. Following step 1032, the process continues to step 1034 to further evaluate other frames of a set.

When it is determined in step 1028 that a frame is not identical to or substantially identical to one or more frames in the second or third sets of frames the process continues to step 1034. In step 1034, it is determined whether there are additional frames (e.g., 931-932) in the first set of frames 922 to be evaluated. When additional frames are to be evaluated the process returns to step 1024 to determine whether another frame in the first set is identical to one or more frames in the second or third sets. When it is determined in step 1034 that there are no further frames to be evaluated the process 1020 terminates and/or return to step 522 of the process 520 and FIG. 5. The process 1020, can be repeated for each set of frames 922-924, and/or is implemented once a predefined number of sets of frames are received.

By repeating frames in subsequent and/or consecutive sets or groupings of frames without incorporating sequence numbers into the frames the number of available bits within a frame can be increased. Further, two or more different frames within a set of frames can be sent efficiently at the same time. For example, the first frame 930, 933, 936 of each of the sets of frames 922-924, respectively, can each identically carry a first payload, while the second frame 931, 934, 937 of the sets 922-924 can each identically carry a second payload, and/or the third frame 932, 935, 938 of the sets 922-924 can each identically carry a third payload. This allows three different payloads to be communicated in a similar amount of time as transmitting three payloads in legacy systems where a first set of three frames might each identically carry a first payload, a second set of frames might each identically carry a second payload and a third set of frames might each identically carry a third payload. Additionally or alternatively, the use of multiple sets of frames can be utilized in transmitting relatively long communications, commands and/or data (e.g., a 64-bit key). For example, a relatively long command can be distributed between two or more frames within a single set (e.g., distributed over frames 930-932) and duplicated in one or more subsequent sets of frames.

Figure 11:
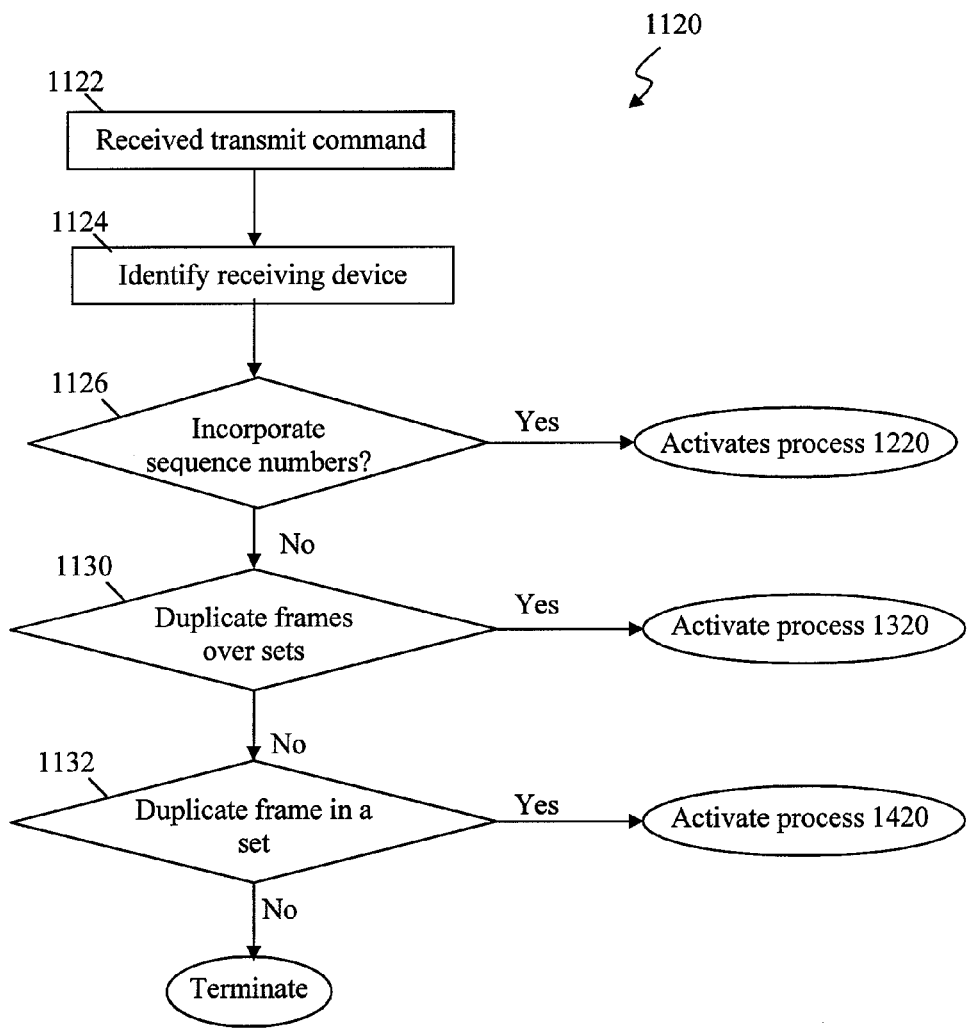
FIG. 11 depicts a simplified flow diagram of a process of generating and transmitting communications according to some embodiments.

FIG. 11 depicts a simplified flow diagram of a process 1120 of generating and transmitting communications according to some embodiments. In step 1122, a transmit command is received and a communication to be transmitted is identified. For example, a user selects a button on a user interface 134 of a transmitting device 122, or a controller 130 determines that a communication is to be initiated or other relevant transmit commands. In step 1124, a receiving device and/or a type of receiving device is identified. The identification can be based on a user selecting a button on the user interface identifying a receiving device (e.g., many remote control devices can communicate with multiple devices and the user interface can include buttons to identify which of the devices to direct communications, which is typically recorded in a temporary storage upon selection so that further commands are directed to the selected device).

In step 1126, it is determined in implementing the communication whether sequence numbers 630 are to be incorporated into the frames (e.g., 622-624) of the communication. This determination can, in some embodiments, be based on the type of device receiving the communication. In some instances, the transmitting device 122 maintains one or more records, tables, listings or the like of devices with which it can communicate and that can further identify information about the receiving device, such as a product type ID, available commands, a communication protocol, whether sequence numbers are to be incorporated into the frames, numbers of frames in a set of frames and/or other information. When it is determined that sequence numbers are to be implemented, the process 1120 activates a process 1220 that configures a communication to include sequence numbers as described below referencing FIG. 12.

Alternatively, when it is determined that sequence numbers are not to be implemented, the process continues to step 1130 where it is determined whether a command and/or communication is to be communicated over frames duplicated in one or more separate sets of frames. When a communication is to be communicated over frames duplicated in separate sets of frames a process 1320 is activated that configures the multiple sets of frames as described below with reference to FIG. 13. In those instances where communications are not to be duplicated in separate sets of frames step 1132 is entered where it is determined whether one or more frames are to be duplicated within a single set of frame. Again, this determination can be based at least in part on the device receiving the communication (e.g., the listing can identify the device as a legacy device that expects to see duplicate frames in a single frame set of three consecutive frames). When it is determined that frames are to be duplicated within a set of frames, a process 1420 that configures a communication to include duplicated frames in a set is activated as described below with reference to FIG. 14. As introduced above, many legacy device and/or other devices expect duplicate frames in a single set of frames. When frames are not to be duplicated within a single set of frames the process terminates. Process 1120, at least in part, allows some embodiments to extend the communication protocols while still maintaining backwards compatibility.

Figure 12:
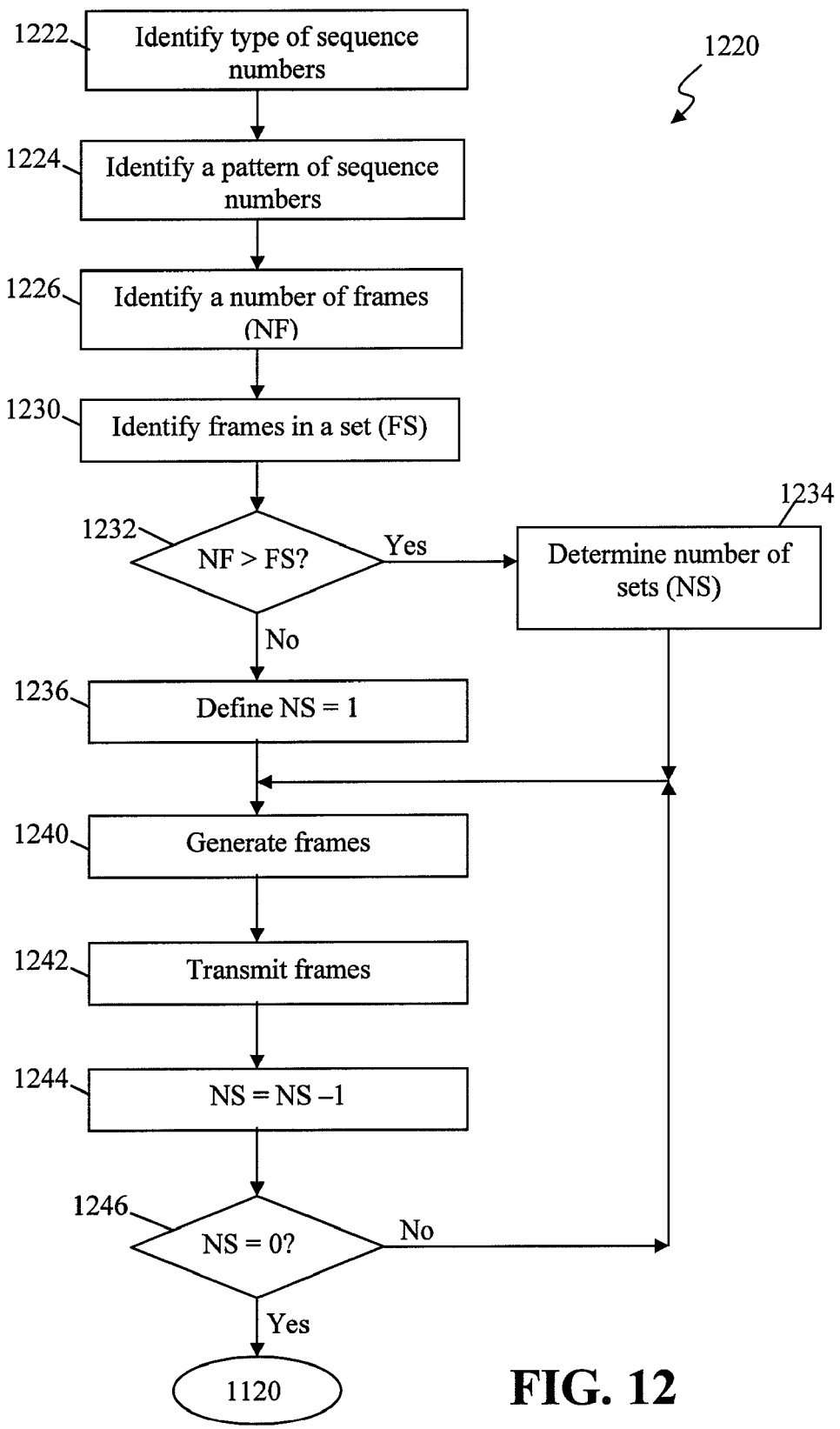
FIG. 12 shows a simplified flow diagram of an example of a process to generate a communication when sequence numbers are to be incorporated into the communication.

FIG. 12 shows a simplified flow diagram of an example of a process 1220 to generate a communication when sequence numbers are to be incorporated into the communication. In step 1222, the type of sequence numbers are identified and the number of bits to be used to define the sequence number is further determined (e.g., 2-bit sequence numbers, 3-bit sequence numbers or the like). Again, this can depend on the device receiving the communication, a communication channel, a number of devices available to be communicated with, a type of communication being transmitted (e.g., type of command, request, information, and the like) and/or other such factors. In step 1224, a pattern or arrangement of sequence numbers is identified and/or selected (e.g., 0, 1, 2, 0, 1, 2, . . . ). In some instances, a transmitting device is limited to a single pattern. In other embodiments, a listing of sequence patterns is provided and a pattern to be used is selected from the listing (e.g., selected in a round robin process, based on previous patterns used, device being communicated with, and/or other such factors). In some embodiments, the frames can define or notify the receiving device of the number of frames in a set and/or vise versa.

In step 1226, a number of frames needed to fully and/or effectively transmit the communication to the receiving device is identified. The number of frames can vary depending on the communication to be communicated, the receiving device (e.g., based on the device type ID), the number of bits of the sequence numbers and/or other such factors. In some implementations, a variable such as a number of frames (NF) variable is set to the identified number of frames needed to transmit the communication. In step 1230, a number of frames to be communicated in a set of frames is identified (e.g., three (3) consecutive frames in a set), and a frames per set variable (FS) can be set to the identified number of frames. The number of frames in a set can similarly depend on one or more factors, such as the protocol of the communication, the receiving device and other relevant factors. In some instances the number of frames (NF) to transmit a communication can exceed the number of frames in a set (FS) such that multiple sets of frames (NS) are needed to fully complete the communication.

In step 1232, it is determined whether the number of frames (NF) needed to communicate the command and/or communication is greater than the number of frames in the set (FS). When the number of frames needed is greater than the number of frames in a set step 1234 is entered where a number of sets of frames needed to complete the communication is determined and a number of sets (NS) variable is defined as the determined number. Alternatively, step 1236 is entered where the number of sets is defined as one (NS=1). As described above, some implementations may repeat one or more frames in a set of frames. The number of frames to be repeated typically is not counted when determining a number of frames (NF) to complete a communication, but instead is defined according to the number of sets of frames (NS) needed to complete the communication (e.g., when a communication needs two frames (NF=2), the number of frames in a set (FS) is limited three frames and the system repeats each frame twice, the number of sets (NS) needed to complete the communication would be two (2) sets).

In step 1240, the frames for a first set are generated. The assembly of these frames can depend on the communication protocol, the receiving device, whether dummy frames are to be included in the set, whether null bits are to be incorporated into a frame and/or other such factors. In generating the frames, the sequence numbers are incorporated along with the product type ID 636, some or all of the communication, and/or null or dummy data when appropriate. In step 1242, the transmission of the set of frames is initiated. In step 1244, the number of sets is decremented (NS=NS-1). Step 1246 follows, determining whether the number of sets of frames (NS) to complete the transmission of the communication has been transmitted (i.e., NS=0). When further sets of frames are to be communicated the process returns to step 1240 to generate a subsequent set of frames. Alternatively, the process terminates and/or returns to the process 1120 of FIG. 11.

Figure 13:
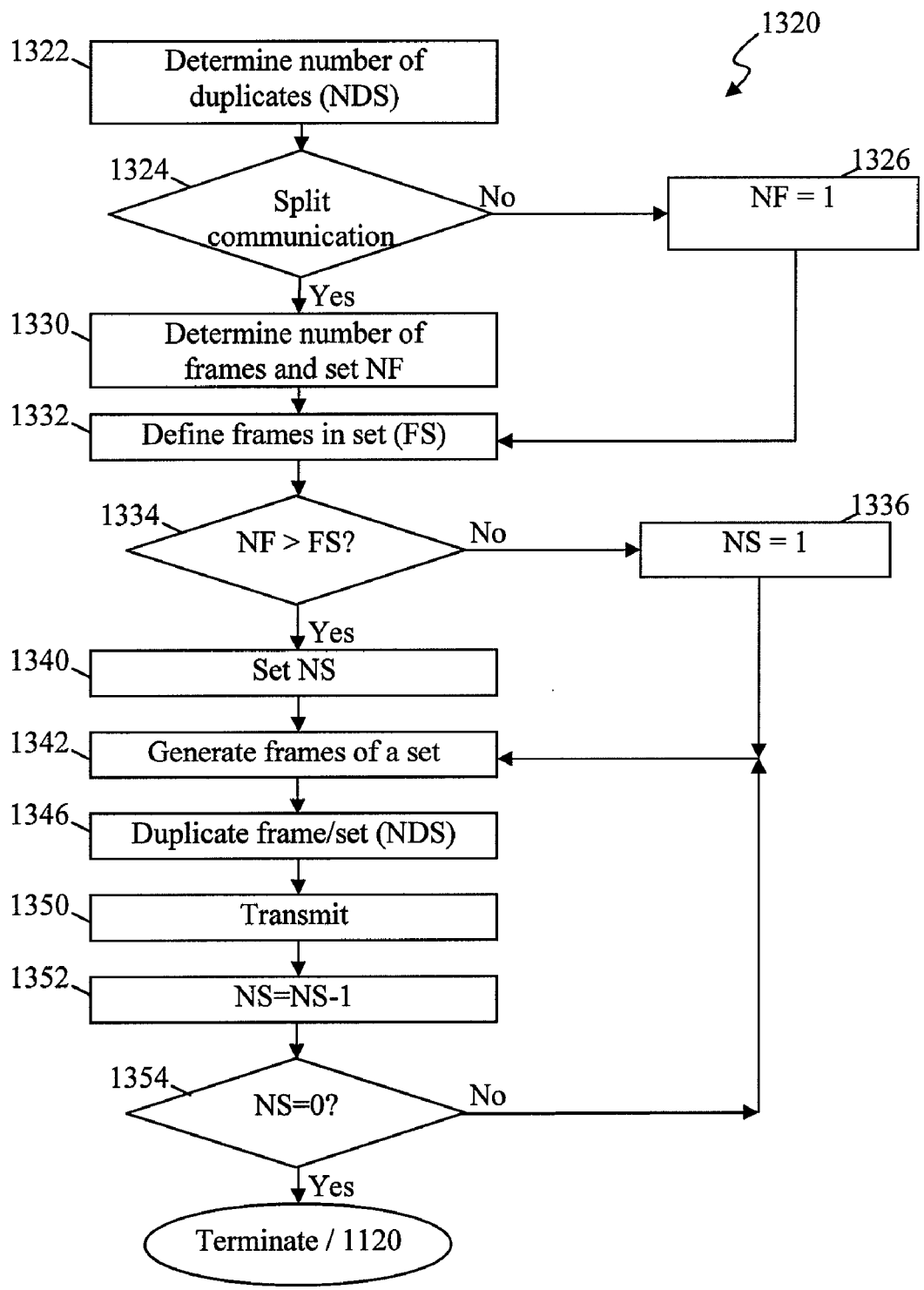
FIG. 13 shows a simplified flow diagram of an example process to communicate one or more communications and/or commands when a single frame is duplicated in a plurality of sets of frames, often consecutively communicated plurality of sets, according to some embodiments.

FIG. 13 shows a simplified flow diagram of an example process 1320 to communicate one or more communications and/or commands when a single frame is duplicated in a plurality of sets of frames, often consecutively communicated plurality of sets, according to some embodiments (e.g., the sets of frames 922-924 shown in FIG. 9). This process can be advantageous, as introduced above, when communication lengths are relatively long, multiplexing multiple communications and/or other factors. In step 1322, a number of times to duplicate a frame and/or a set of frames is identified. As introduced above with respect to at least FIG. 9, a set of frames (e.g., set 922) may, for example, be duplicated a number of times and/or a frame (e.g., frame 930) may be repeated in multiple sets 922-924. The receiving device can then identify that one or more frames are duplicated over the plurality of sets and confirm the reception of the one or more frames according to some embodiments. The optional number of time to duplicate a set or frame (NDS) can be based on the communication protocol, a receiving device, a communication channel 170, noise being experienced over the communication channel and/or other relevant factors. Again as described above, the repeating of a frame in multiple sets is optional and depends on the system implementation.

In step 1324, a determination is made whether a communication is to be split into multiple frames (e.g., when the number of bits to communicate the communication exceeds the available command payload 946 of a frame). The process continues to step 1326 when the communication is not to be split into multiple frames and a number of frames variable (NF) is set to a value of one (1) (i.e., NF=1). Alternatively, when the communication is to be split into multiple frames, step 1330 is entered where the number of frames to communicate the communication is determined and the number of frames variable (NF) is set accordingly. In step 1332, the number of frames to be included in a set (FS) of frames is determined, which can depend on many factors as introduced above (e.g., the communication protocol, receiving device, etc.).

Some embodiments include optional step 1334 where it is determined whether the number of frames (NF) exceeds the number of frames in a set (FS). When the number of frames does not exceed the number for frames in a set, a number of sets variable (NS) is defined as a value of one (1) in optional step 1336. Alternatively, in optional step 1340 a number of sets (NS) is determined that is needed to fully communicate the desired communication distributed over the number of frames identified, and number of sets variable NS is defined according to the identified number. The process continues to step 1342 where frames for a set of frames are generated (e.g., incorporating product type ID, and incorporating the communication, portion of communication and/or dummy data into each relevant frame of a set).

In step 1346, the set of frames (e.g., set 922) is duplicated based on the number of duplicated sets (NDS) as identified in step 1322. The transmission of the set of frames is initiated in step 1350. In step 1352, the number of sets to be communicated is decremented (NS=NS−1). In step 1354, it is determined whether further sets of frames is to be transmitted (e.g., determining whether NS=0). When further sets are to be transmitted, the process returns to step 1342 to generate further frames. Alternatively, the process 1320 terminates, returns to the process 1120 to continue communication transmission.

Figure 14:
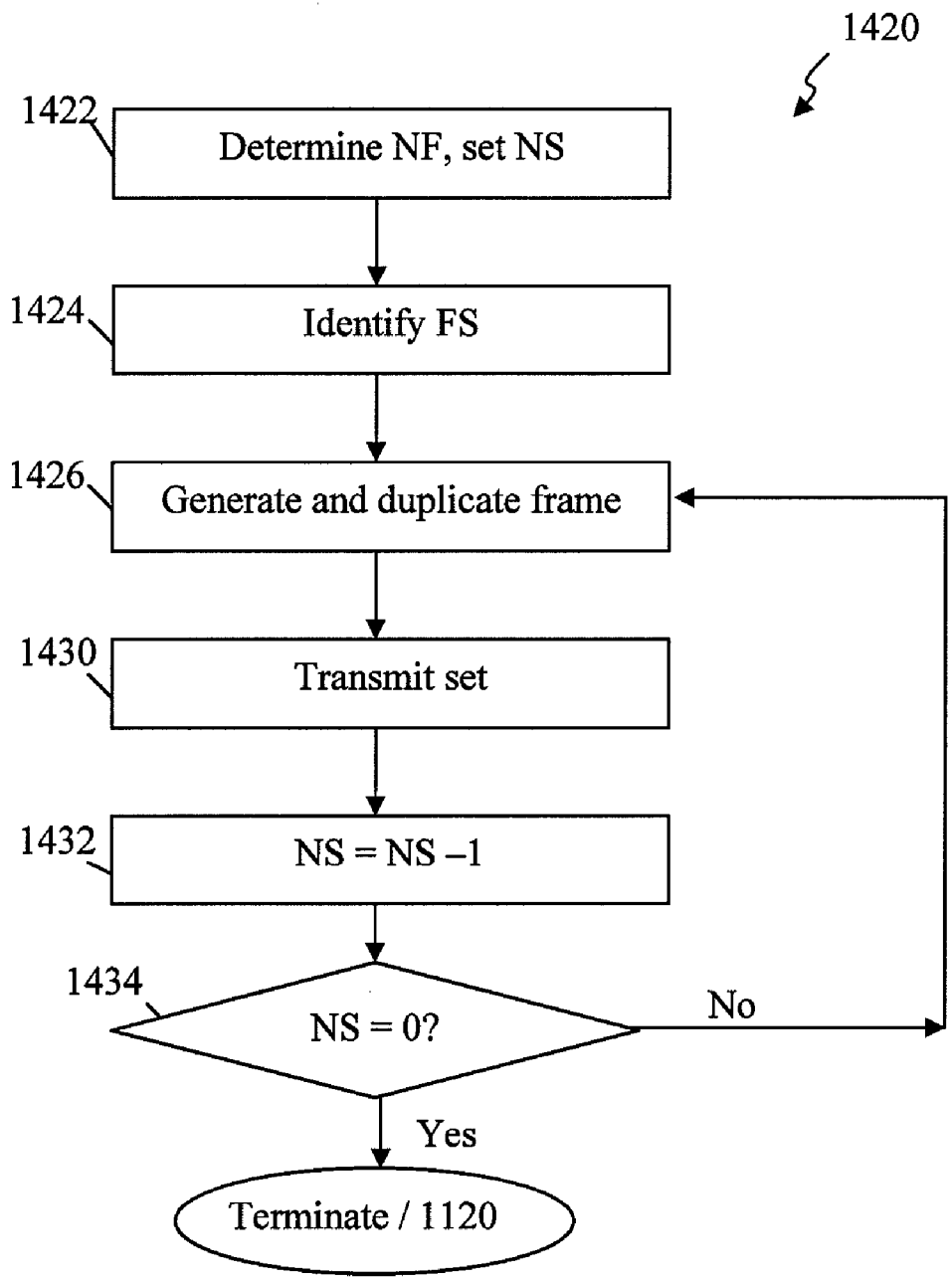
FIG. 14 depicts a simplified flow diagram of a process that implements a communication according to some embodiments.

FIG. 14 depicts a simplified flow diagram of a process 1420 that implements a communication according to some embodiments. In step 1422, a number of frames needed to communicate the communication is determined. Again as introduced above, the number of frames can vary depending on one or more factors, such as the communication or information being communicated, the receiving device, the communication protocol (e.g., whether a frame comprises 12 or another number of bits) and/or other such factors. A number of frames variable (NF) can be set to the determined number (e.g., one frame to communicate a command, such as a "play" command), and in some instances a number of sets of frames (NS) can also be set to the determined number.

In step 1424, a number of frames to be communicated in a set (FS) is identified. In step 1426, a first frame is generated and is duplicated at least once and in some instances is duplicated a number of times so that the number of generated frames equals the number of frames in a set (FS). The assembly of these frames can depend on one or more factors, such as those factors described above with respect to step 1240 of process 1220 and/or other relevant factors. In some instances where the number of frames duplicated is less than the number of frames in a set, one or more additional frames, such as null or dummy frames, may be generated.

In step 1430, the set of frames is transmitted. In step 1432, the number of sets variable NS is decremented (NS=NS−1). In step 1434, it is determined whether the number of sets of frames (NS) to complete the communication has been transmitted (i.e., NS=0). When further sets of frames are to be communicated the process returns to step 1426 to generate a subsequent set of frames. Alternatively, the process terminates and returns to 1120.

Some embodiments can be utilized in transmitting substantially any number of frames of data. In instances were a frame is repeated twice and two consecutive frames are checked by a receiving device, 2-bit sequence numbers can be utilized providing robust extensions of the communication protocol, and frames are ordered so that two consecutive frames are not identical. Similarly, when a receiving device is expecting four frames in a set, four different frames can be transmitted to extend the protocol, while complying and/or operating with legacy devices. As introduced above, the communication of the frames can be implemented through substantially any wired or wireless communication, typically, that repeat some or all of the transmission. By incorporating bits for sequence numbers, the existing communication protocols are extended. Further, the use of multiple different sequence patterns further extends protocols, and error robustness can be improved with redundant sequence numbers. Additionally, the communication protocol can also be extended with frame ordering. The present embodiments can maintain a backward compatibility as the extended protocols do not adversely interfere with legacy communication protocols and/or incorporate the legacy protocols, while new hardware to implement the extended protocols is generally no required. In many embodiments, the extension of protocols is implemented through software and/or firmware at relatively low costs.

While the invention herein disclosed has been described by means of specific embodiments and applications thereof, numerous modifications and variations could be made thereto by those skilled in the art without departing from the scope of the invention set forth in the claims.

What is claimed is:

1. A method of implementing serial communication, comprising:
   identifying a first communication to be transmitted;
   generating, in response to identifying the first communication to be transmitted, a first plurality of frames such that bit data of each of the frames of the first plurality of frames is different than the bit data of each of the other frames of the first plurality of frames, and that a first frame of the first plurality of frames comprises at least a first portion of the first communication,
   wherein the generating the first plurality of frames comprises:
   determining whether to incorporate sequence numbers into the first plurality of frames, wherein the determining whether to incorporate sequence numbers into the first plurality of frames comprises identifying a receiving device and determining whether the receiving device expects to receive frames with sequence numbers;
   when it is determined that the sequence numbers are to be incorporated into the first plurality of frames, incorporating a sequence number into each of the frames of the first plurality of frames; and
   when it is determined that the sequence numbers are not to be incorporated into the first plurality of frames, not incorporating a sequence number into one or more of the frames of the first plurality of frames and determining whether to duplicate the first frame of the first plurality of frames in a second plurality of frames; and
   generating the second plurality of frames such that bit data of each of the frames of the second plurality of frames is different than the bit data of each of the other frames of the second plurality of frames, and that a first frame of the second plurality of frames is a duplicate of the first frame of the first plurality of frames; and
   transmitting the first plurality of frames.

2. The method of claim 1, wherein the incorporating the sequence number into each of the frames of the first plurality of frames comprises:
   selecting a first sequence pattern;
   determining a plurality of sequence numbers defining the first sequence pattern; and
   incorporating one of the plurality of sequence numbers into each of the first plurality of frames.

3. The method of claim 2, wherein the determining the plurality of sequence numbers comprises determining the sequence numbers such that each of the plurality of sequence numbers is different.

4. The method of claim 1, wherein the generating the first plurality of frames comprises incorporating at least the first portion of the first communication into at least the first frame of the first plurality of frames and incorporating at least a second portion of the first communication into at least a second frame of the first plurality of frames.

5. The method of claim 4, further comprising:
generating a second plurality of frames such that at least a first frame of the second plurality of frames is identical to the first frame of the first plurality of frames and that a second frame of the second plurality of frames is identical to the second frame of the first plurality of frames; and
transmitting the second plurality of frames.

6. The method of claim 1, further comprising:
generating a second plurality of frames such that at least a first frame of the second plurality of frames is identical to the first frame of the first plurality of frames and different from each of the other frames of the first plurality of frames, and that bit data of each frame of the second plurality of frames is different than each of the other frames of the first plurality of frames; and
transmitting the second plurality of frames.

7. The method of claim 1, further comprising:
identifying a second communication to be transmitted;
determining whether a first frame of a third plurality of frames is to be duplicated in the third plurality of frames; and
generating the third plurality of frames such that the first frame is duplicated such that at least a second frame of the third plurality of frames is the duplicate of the first frame of the third plurality; and
transmitting the third plurality of frames.

8. The method of claim 7, further comprising:
identifying that the first communication is to be transmitted to a first receiving device; and
identifying that the second communication is to be transmitted to a second receiving device.

9. A method of serially communicating data, comprising:
receiving a first plurality of frames each comprising bit data;
determining whether the bit data of each of the first plurality of frames is different from the bit data of each of the other frames of the first plurality of frames;
extracting, using a processor, a portion of the bit data from each of the first plurality of frames when it is determined that the bit data of each of the first plurality of frames is different from the bit data of each of the other frames of the first plurality of frames;
arranging the portions of the bit data from each of the first plurality of frames;
determining whether the arranged portions of the bit data match a predefined arrangement of sequence numbers;
extracting a first payload from first frame of the first plurality of frames when the arranged portions of the bit data match the predefined arrangement of sequence numbers;
receiving a second plurality of frames each comprising bit data;
determining whether a first frame of the second plurality of frames is identical to the first frame of the first plurality of frames when it is determined that the arranged portions of the bit data do not match the predefined arrangement of sequence numbers; and
extracting the first payload from the first frame of the first plurality of frames when the first frame of the first plurality of frames is identical to the first frame of the second plurality of frames.

10. The method of claim 9, wherein the extracting the portion of the bit data comprises extracting a sequence number from each of the first plurality of frames.

11. The method of claim 9, further comprising:
determining whether a second frame of the first plurality of frames is identical to a second frame of the second plurality of frames;
extracting a second payload from the second frame of the first plurality of frames when the a second frame of the first plurality of data is identical to the second frame of the second plurality of frames; and
determining a communication comprising combining at least a portion of the first payload with at least a portion of the second payload.

12. The method of claim 9, further comprising:
extracting the first payload from the first frame of the first plurality of frames when it is determined that the bit data of each of the first plurality of frames is not different from the bit data of each of the other frames of the first plurality of frames and that the bit data of the first frame of the first plurality of frames is identical to the bit data of a second frame of the first plurality of frames.

13. The method of claim 9, further comprising:
extracting a sequence numbers from each of the second plurality of frames when it is determined that the bit data of the first frame of the first plurality of frames is different than the bit data of the first frame of the second plurality of frames;
arranging the sequence numbers;
determining whether the arranged sequence numbers match a predefined arrangement of sequence numbers; and
extracting a second payload from the first frame of the second plurality of frames when the arranged sequence numbers match the predefined arrangement of sequence numbers.

14. The method of claim 9, further comprising:
extracting the first payload from the first frame of the first plurality of frames when it is determined that the bit data of each of the first plurality of frames is not different from the bit data of each of the other frames of the first plurality of frames and that the bit data of the first frame of the first plurality of frames is identical to the bit data of a second frame of the first plurality of data.

* * * * *

UNITED STATES PATENT AND TRADEMARK OFFICE
CERTIFICATE OF CORRECTION

| | | |
|---|---|---|
| PATENT NO. | : 8,027,359 B2 | Page 1 of 1 |
| APPLICATION NO. | : 11/690956 | |
| DATED | : September 27, 2011 | |
| INVENTOR(S) | : Iwamura | |

It is certified that error appears in the above-identified patent and that said Letters Patent is hereby corrected as shown below:

In the CLAIMS:
Claim 11, column 20, line 23, delete "the a" and insert --the--.

Signed and Sealed this
Third Day of January, 2012

David J. Kappos
*Director of the United States Patent and Trademark Office*